Feb. 18, 1964    J. M. E. LAPRAY    3,121,441
SIPHON FOR USE IN IRRIGATION AND FOR LIKE PURPOSES
Filed March 6, 1962

Inventor
J. M. E. LAPRAY
By
Holcombe, Wetherill & Brisebois
Attorneys

United States Patent Office 3,121,441
Patented Feb. 18, 1964

3,121,441
SIPHON FOR USE IN IRRIGATION AND FOR
LIKE PURPOSES
Judith Marie Elvire Lapray, Ave. du Soudan 6,
Rabat, Morocco
Filed Mar. 6, 1962, Ser. No. 177,768
Claims priority, application Morocco Mar. 9, 1961
4 Claims. (Cl. 137—147)

In my prior U.S. patent application S.N. 858,926, now Patent No. 3,079,939, I have described portable means for diverting a liquid from an irrigation ditch, and comprising in combination a siphon, means for automatically priming and interrupting the flow through the siphon, means for mounting it on the wall of the ditch, and means for completely or partially cutting off the flow of liquid in the ditch.

This application is directed to an improvement in said device which is essentially characterized by the fact that the means for automatically priming the siphon comprises a chamber having preferably the shape of a cylinder sector, but which may be cylindrical or prismatic in shape, and within which a movable member is displaced, either by rotation about an axis, or by translation along the axis of the cylinder or prism, the movable member being provided with means for moving it from outside the chamber, so as to permit the siphon to be primed by introducing into it at one time all the liquid in said chamber. The siphon may also comprise a diversion ledge which facilitates this priming, and the siphon may open into the chamber at a point in its lateral wall near the end of the path of travel of the movable member so that this member leaves the fluid passage unobstructed after priming and may be used to regulate the flow through the siphon by moving it slightly backward.

In one embodiment of the invention the apparatus is provided with mounting means adaptable to any type of canal or ditch wall and comprising a prop in the form of an angle iron fixed to the wall of the chamber which will rest against the inside of the canal, and a prop which is adjustable in length and pivotally attached to the branch of the siphon outside the canal, so as to permit flow through the siphon to be stopped by swinging up the siphon when the latter prop is swung about its pivot point. The invention moreover comprises means for blocking the flow of liquid in the canal, which is shaped like a cross-section therethrough and may be swung about any suitable center, or translated, and permits the height of the inflow to be regulated, either to regulate the flow, or fill the priming chamber.

Figure 1:
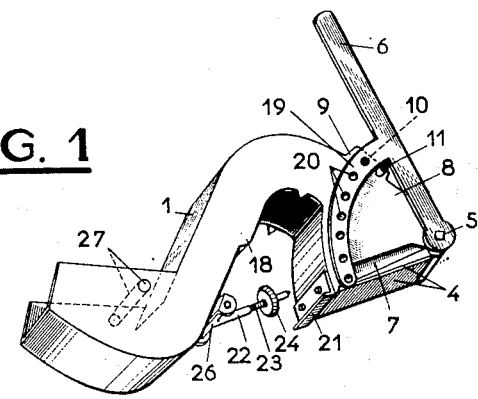
Figure 2:
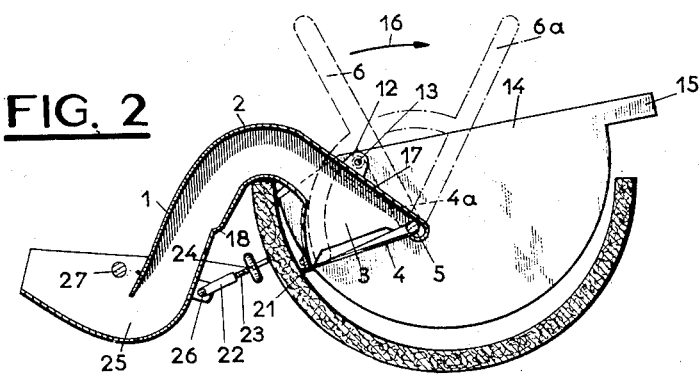
Figure 3:
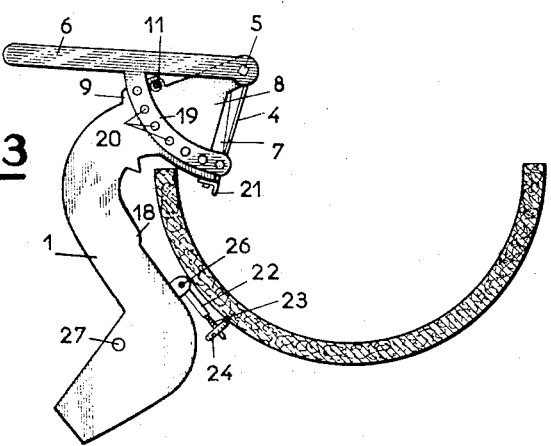

In order that the object of the invention may be better understood, one embodiment thereof will now be described, purely by way of illustration, and without limiting the scope of the invention to the details thereof, shown in the accompanying drawings, in which:

FIG. 1 is a perspective view of the device;
FIG. 2 is a cross-sectional view of the siphon in operating position on the wall of a ditch; and
FIG. 3 shows an exterior view of the device in non-operating position on a canal wall.

As seen on the figures, the device comprises a siphon 1 defining an S-shaped passageway which is rectangular in cross-section, the suction end of which opens into a chamber 3 having the shape of a sector of a cylinder. A movable member 4 is mounted in this chamber and comprises a shutter mounted to swing about the shaft 5 at the center of the sector. The edges of this shutter pass as closely as possible to the walls of the chamber 3. The shaft 5 may be rotated to turn the shutter from outside the chamber by means of a lever 6 fixed to said shaft.

At rest, that is to say, when the lever 6 is in the position shown on FIG. 1, the shutter 4 is in its lowest position and leaves uncovered the two openings 7 in the opposite sides 8 of the chamber 3. An ear 9 extends from the sides 8 on the side of the lever and is provided with a first hole 10, the purpose of which will be hereinafter explained, and a second hole 11. The ear 12 on the opposite side is provided with a hole 13 which registers with the hole 11. The shaft which carries the cut-off plate 14 is seated in these holes, and said plate has a shape corresponding to the inner section of the ditch or canal. The cut-off plate 14 may consist of a flat sheet of metal cut to shape, and provided with a handle 15. The shaft may consist of a plain flat-headed bolt, in order that the plate may be mounted on either the same side as or the side opposite to said lever 6, so that it may always be positioned below the siphon with respect to the direction of flow in the canal, regardless of which side of the canal it is mounted on. By thus blocking the canal below the siphon, by means of the cut-off plate, the level of the water is raised to a height at which it fills the chamber 3, the water entering through the holes 7.

It then suffices to swing the lever 6 in the direction of the arrow 16 and thus bring it into the position shown at 6a on FIG. 2, thus rotating the shutter 4 in the chamber 3, which empties into the siphon the water contained in said chamber. The shutter then comes to rest at 4a flat against the upper wall 17 of the chamber 3. Priming may be facilitated by providing a ledge 18 of the type shown in said application S.N. 858,926. The cut-off plate may then be lifted if necessary to permit the downstream part of the canal to be simultaneously supplied, so long as the level of the water remains high enough to cover the openings 7.

Once the siphon has been primed, it is also possible to regulate the flow therethrough by moving the lever 6 backward from the position 6a to a position intermediate between its solid line and dotted line positions, so that the shutter, leaving the position 4a, comes to partially block the passage between the chamber 3 and the siphon outlet. Once this has been adjusted as desired, the lever can be held in the desired position. For this purpose the lever is provided with a lateral extension 19 in the form of a ring segment perforated with a series of holes 20 which come successively into registration with the hole 10 in the ear 9. A peg or lock may then be passed through the registering holes in order to hold the lever 6 in position.

The means for holding the device on the canal wall comprises a prop 21 in the form of an angle iron fixed to the wall of the chamber 3 and which rests on the inner wall of the canal, together with a swingable prop 22 which is adjustable in length, because of a threaded part 23 which screws into the pivoted end of the prop and is provided with a knurled ring 24. By thus adjusting the length of this prop and by selecting one of a plurality of interchangeable angle irons 21, the device may be adapted to fit all sizes and shapes of canal wall. In this case it is often necessary to also change the cut-off plate 14. Finally, the prop 22 is so pivoted to the lower branch 25 of the siphon that it may be folded out of the way by swinging it about its pivotal axis 26. The apparatus also comprises a tube 27 soldered to the lower, outlet portion of the siphon. The weight of the water in the siphon as well as the reactive force due to the jet ordinarily presses the prop against the canal wall. The tube 27 serves as a handle with which to lift the device so that the prop may be disengaged from the canal wall and swung down. The entire device may then be swung until the openings 7 emerge from the surface of the liquid, thus interrupting the flow through the siphon. The device is then swung further into the position shown on FIG. 3 so as to be taken out of service.

It will be readily understood that this embodiment has been described purely by way of example and may be modified as to detail without thereby departing from the spirit of the invention. In particular, the movable member 4, instead of swinging about its shaft 5, may be translated in a direction perpendicular to its surface, the chamber 3 being then prismatic or cylindrical in shape, with its generatrices parallel to the direction of translation. Moreover, the movable member, which likewise serves to regulate the rate of flow, may also be used, in combination with a float, to insure an absolutely constant rate of flow, independent of the height of liquid in the canal. To this end the transmission between the float and the movable member 4 comprises a mechanism such as a cam contoured to take into account the law governing the rate at which the flow varies in proportion to the height of the liquid, so as to compensate therefor.

What is claimed is:

1. A portable siphon provided at its inlet end with a transverse plate which is movable from a first position near said inlet end to a second position in which at least part thereof is closer to the outlet end of said siphon than when in said first position, the walls of said siphon being provided with relatively small supplemental inlets located between the two positions of said plate adjacent said first position, so that water may be admitted to said siphon through said supplemental inlets and then swept further into said siphon by rapid movement of said transverse plate from its first to its second position.

2. A siphon as claimed in claim 1 in which a longitudinally adjustable prop is pivotally attached to the underside of the outlet end of said siphon, and forms with the outlet end of said siphon clamping means for gripping a supporting wall.

3. A siphon as claimed in claim 1 in which said siphon pivotally carries a removable cut-off plate contoured to block a canal when said siphon is mounted on a wall thereof and said cut-off plate is swung into said canal, said cut-off plate being mounted for movement in a plane at right angles to said siphon.

4. A siphon as claimed in claim 1 provided with means for holding said transverse plate in any of a plurality of positions.

References Cited in the file of this patent

UNITED STATES PATENTS

| 1,211,523 | Anderson | Jan. 9, 1917 |
| 1,349,683 | McCloud | Aug. 17, 1920 |
| 2,272,655 | Briese | Feb. 10, 1942 |

FOREIGN PATENTS

| 167,867 | Australia | Oct. 15, 1953 |